US011827539B2

(12) United States Patent
Liang et al.

(10) Patent No.: US 11,827,539 B2
(45) Date of Patent: Nov. 28, 2023

(54) NEAR-ZERO MAINTENANCE MEMBRANE-BASED INTEGRATED PURIFICATION DEVICE FOR DRINKING WATER SUPPLY OF VILLAGES AND TOWNS AND A METHOD FOR TREATING SOURCE WATER THEREOF

(71) Applicant: Harbin Institute of Technology, Harbin (CN)

(72) Inventors: Heng Liang, Harbin (CN); Xiaobin Tang, Harbin (CN); Xishou Guo, Harbin (CN); Jinlong Wang, Harbin (CN); Weijia Gong, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 17/955,576

(22) Filed: Sep. 29, 2022

(65) Prior Publication Data
US 2023/0110489 A1 Apr. 13, 2023

(30) Foreign Application Priority Data
Sep. 29, 2021 (CN) .......................... 202111149720.0

(51) Int. Cl.
*C02F 1/44* (2023.01)
*B01D 61/14* (2006.01)
*B01D 61/18* (2006.01)

(52) U.S. Cl.
CPC ............ *C02F 1/444* (2013.01); *B01D 61/146* (2022.08); *B01D 61/18* (2013.01)

(58) Field of Classification Search
CPC .. C02F 1/444; C02F 9/00; C02F 1/001; C02F 1/283; C02F 1/76; C02F 2001/007;
(Continued)

(56) References Cited

FOREIGN PATENT DOCUMENTS

| CN | 106315988 A | * | 1/2017 |
| CN | 109775893 A | * | 5/2019 |
| KR | 101235003 B1 | * | 2/2013 |

OTHER PUBLICATIONS

English language machine translation of CN109775893A, 13 pages, No Date.*
(Continued)

*Primary Examiner* — Pranav N Patel
(74) *Attorney, Agent, or Firm* — Bayramoglu Law Offices LLC

(57) ABSTRACT

A near-zero maintenance integrated purification device for drinking water supply of villages and towns and a method for treating source water using this device are provided to solve the multi-pollution problems caused by microorganisms, turbidity, iron, manganese, taste and odor, and organic matter in the drinking water sources of villages and towns. The device includes a small-spacing folding plate speed sink regulating water tank, a small diameter tube reactor, a granular active carbon (GAC) slow-speed filter tank, a gravity-driven ultrafiltration membrane tank and an ipsilateral U-turn corridor clean water tank. The near-zero maintenance integrated purification device is applicable to different types of water sources (e.g., groundwater, lake water, reservoir water, spring water, snowmelt water, cellar water and rain water, etc.), and could efficiently remove kinds of pollutants, improving the biological and chemical safety of drinking water.

18 Claims, 2 Drawing Sheets

(58) Field of Classification Search
CPC ............ C02F 2101/16; C02F 2101/203; C02F 2101/206; C02F 2101/30; C02F 2201/009; C02F 2303/04; C02F 3/00; B01D 61/146; B01D 61/18
See application file for complete search history.

(56) References Cited

OTHER PUBLICATIONS

English language machine translation of CN106315988A, 7 Pages, No Date.*
English language machine translation of KR101235003B1, 8 Pages, No Date.*
GB 5749-2006, Standards for drinking water quality, China National Standards, 2006, pp. 1-9.

\* cited by examiner

NEAR-ZERO MAINTENANCE MEMBRANE-BASED INTEGRATED PURIFICATION DEVICE FOR DRINKING WATER SUPPLY OF VILLAGES AND TOWNS AND A METHOD FOR TREATING SOURCE WATER THEREOF

CROSS REFERENCE TO THE RELATED APPLICATIONS

This application is based upon and claims priority to Chinese Patent Application No. 202111149720.0, filed on Sep. 29, 2021, the entire contents of which are incorporated herein by reference.

TECHNICAL FIELD

The invention relates to a device and a method for treating source water in villages and towns.

BACKGROUND

More than 90% of the drinking water sources in villages and towns are mainly faced with multiple pollution problems, such as microorganisms, turbidity, iron, manganese, taste and odor, organic matters, and micropollutants (e.g., pesticides, insecticides, herbicides, and ammonia nitrogen) caused by agriculture or animal husbandry. In addition, the water pollution problems in rural areas are rather severe and complex, with significant regionalism and difference. At the same time, the scattered population distribution of villages and towns, small the number of people in each colony, significant fluctuation of water consumption daily, and low water consumption, all of which significantly played a negative impact on the performance and stability of the existing treatment process. Besides, there is no specific technology or equipment for water treatment in the villages and towns. Most adopted technologies or processes in the villages and towns are just copied and scaled down from the ones employed in the big cities, resulting in a series of apparent bottleneck problems, such as low and unstable treatment efficiency, large footprint, high energy consumption, high cost of water production, complex operation & maintenance, and requirements of specialized and skilled workers.

Turbidity and taste and odor, as sensory indicators, will affect the perception of people and bring intense discomfort when drinking water. Excessive intake of iron and manganese will cause a chronic toxic effect on the human body. For example, when the iron concentration exceeds the binding capacity of hemoglobin, it will form precipitation, leading to metabolic acidosis, harm to the liver, and even induce diabetes. At the same time, iron and manganese have a significant taste and odor, and would pollute the living utensils. The content of micropollutants is very small, but they are very harmful. They are difficult to be metabolized and can be enriched in the human body continuously, which poses a great threat to human health. The conventional treatment process is mainly designed to remove the turbidity and microorganisms, and thus confers a poor removal capacity for the dissolved organic matter, iron, manganese, ammonia nitrogen, and trace organic pollutants, and. Therefore, it is challenging for the conventional treatment process to ensure water supply safety in villages and towns.

Microbial safety is the primary factor affecting the safety of the drinking water supply. Currently, in villages and towns, most water supply systems are only equipped with basic facilities, such as water storage tanks, water supply networks, and simple disinfectant devices, lacking effective water treatment processes for kinds of contaminants. Most villages and towns still face the problem of water pollution in the drinking water supply, which seriously threatens locals' physical and psychological health.

Therefore, there are urgent requirements for a water purification device with excellent pollution removal efficiency, simple operation, less operation & maintenance, low energy consumption, low cost, and simple structure to solve the drinking water quality problem in villages and towns.

SUMMARY

The purpose of the present invention is to solve the multiple pollution problems in the drinking water source of villages and towns, such as microorganisms, turbidity, iron, manganese, taste and odor, and organic matter, and to provide a membrane-based integrated purification device with simple operation, low energy consumption, near-zero maintenance and no requirements of specialized and skilled workers to operate, as well as to provide a related method for treating the source water thereof.

A near-zero maintenance integrated purification device for drinking water supply of villages and towns includes a small-spacing folding plate speed sink regulating water tank, a small diameter tubular reactor, a granular active carbon (GAC) slow-speed filter, a gravity-driven ultrafiltration membrane tank, and an ipsilateral U-turn corridor clean water tank;

One end of the small-spacing folding plate speed sink regulating water tank connected to raw water through the water inlet pipe, and the other end of the small-spacing folding plate speed sink regulating water tank connected to the small diameter tubular reactor through its outlet pipe. Multiple folded plates are installed in the small-spacing folding plate speed sink regulating water tank to form vertical folding flow;

The small diameter tubular reactor includes small diameter inclined tubes, a first perforated uniform water wall, a second perforated uniform water wall, and a perforated water collection pipe. The first perforated uniform water wall and the second perforated uniform water wall are set orderly at the inlet of the small diameter tubular reactor to distribute water uniformity, locating at the lower part of the ineffective area of the small diameter inclined tube. Thereinto, the holes of the first perforated uniform water wall and the second perforated uniform water wall are interlaced. The upper part of the small diameter inclined tube is the clean water collection area, and the lower part of the small diameter inclined tube is the water distribution area, and some perforated water collection pipes with uniformly distributed pores are installed in the clean water collection area.

A water collection channel is arranged between the small diameter tubular reactor and the GAC slow-speed filter. GAC slow-speed filter includes the main aeration pipe, aeration branch pipe, water distribution hole, support layer, activated carbon layer, and perforated water collection pipe of GAC slow-speed filter. The main aeration pipe, water distribution hole, support layer, activated carbon layer, and perforated water collection pipe of the GAC slow-speed filter are arranged orderly in GAC slow-speed filter from bottom to top. A plurality of aeration branch pipes is connected to the main aeration pipe, and the effluent water of the GAC slow-speed filter flows into the water collection channel through its water distribution holes;

The GAC slow-speed filter connected to the gravity-driven ultrafiltration membrane tank through the perforated water collection pipe. In the gravity-driven ultrafiltration membrane tank, the main aeration pipe, the membrane module, and the water collection pipe of the gravity-driven ultrafiltration membrane tank are arranged orderly from bottom to top. A plurality of aeration branch pipes of the gravity-driven ultrafiltration membrane tank is connected to the main aeration pipe of the gravity-driven ultrafiltration membrane tank;

The gravity-driven ultrafiltration membrane tank connected to the ipsilateral U-turn corridor clean water tank through the water collection pipe of the gravity-driven ultrafiltration membrane tank. A plurality of partition walls are arranged in the ipsilateral U-turn corridor clean water tank to form a push flow pattern. A suction well connected to the rotary corridor is provided at the bottom of the ipsilateral U-turn corridor clean water tank.

A detailed method for treating source water by an integrated purification device with near-zero maintenance for drinking water supply of villages and towns is carried out according to the following steps:

I. The feed water flows into the small-spacing folding plate speed sink regulating water tank. The large particles sink gradually to the bottom of the small-spacing folding plate speed sink regulating water tank due to the decline of flow velocity, and sedimentary large particles are discharged through the first perforated mud discharge pipe;

II. After the initial sedimentation of the small-spacing folding plate speed sink regulating water tank, the water flows into the small diameter tubular reactor and enters the water distribution area through the first perforated uniform wall and the second perforated uniform wall in turn. In the process of water flowing through the small diameter inclined tube, the larger particles, sand, and suspended substances sink to the bottom of the small pipe reactor and then are discharged through the second perforated mud discharge pipe; The water flows from the water collection pipe in the clean water area into the water collection channel, and then the clean and precipitated water is obtained;

III. Next, the precipitated water enters the GAC slow-speed filter through the water distribution hole. The GAC slow-speed filter adopts upward flow, and the bottom is the water distribution area. The waiting for being filtered water flows through the supporting layer and the activated carbon layer orderly during the period of filtration. Meanwhile, the aeration device, main aeration pipe, and aeration branch pipe located at the bottom of the GAC slow-speed filter are designed to supplement the dissolved oxygen (DO), aiming to meet the requirement of biological activity. The filtered water is collected by the perforated water collection pipe of GAC slow-speed filter and then enters the gravity-driven ultrafiltration membrane tank. Consequently, the filtered water is obtained;

IV. In the gravity-driven ultrafiltration membrane tank, the filtration process is conducted in the dead-end mode and the water enters the membrane module through its internal pores. The main aeration pipe and the aeration branch pipe of the gravity-driven ultrafiltration membrane tank are synergistically used to aerate; The membrane effluent water flows into the water collection pipe of the gravity-driven ultrafiltration membrane tank and then into the ipsilateral U-turn corridor clean water tank;

V. A plurality of reciprocating and rotary partitions are installed in the ipsilateral U-turn corridor clean water tank with expects to form a push flow state. The disinfection facility is equipped with the metering pump to add disinfectant. The disinfected water is transported to the residents of villages and towns by the pump. Up to now the detailed method for treating source water by the near-zero maintenance integrated purification device for drinking water supply of villages and towns is completed.

The method for treating source water by applying a near-zero maintenance integrated purification device for drinking water supply of villages has the following advantages:

1. Low energy consumption, low cost, green and chemicals-free:
   (1) The driven-pressure of the conventional ultrafiltration membrane purification equipment is relatively high, usually 0.05-0.1 MPa, while the driven-pressure of the near-zero maintenance integrated purification device for drinking water supply of villages and towns is only 0.005-0.007 MPa, which is far lower than that of the conventional ultrafiltration membrane purification equipment. Besides, no suction pump is required, which significantly reduces the energy consumption;
   (2) No coagulant is added in the water purification process, which saves the reagent cost;
   (3) A near-zero maintenance integrated purification device for drinking water supply of villages and towns was driven by the gravity force formed by the water level distance between the feed water and treated water, which will not generate additional consumptions of energy and power during long-term operation, so the operation cost of the equipment is almost zero, but the operation cost generated by the disinfection unit should be considered.

2. Simple operation, near-zero maintenance, simple operation and management:
   The near-zero maintenance integrated purification device for drinking water supply of villages and towns adopts a continuous filtration mode. Compared with conventional ultrafiltration process, it does not need any hydraulic backwash systems (e.g., backwash pumps, backwash water tanks, backwash pipelines, and backwash automatic control systems), cross flow systems (e.g., cross flow pipelines, and control systems), chemical cleaning systems (e.g., reagent tank, reagent dosing pumps, reagent dosing pipelines, reagent metering equipment, waste liquid collection tank, and automatic control system). Therefore, the device of present invention is characterized for its simple operation, low maintenance and simple management;

3. Synchronous removals of multiple pollutants, high water purification efficiency:
   The inventive device organically combines the five filtration barriers of "small-spacing folding plate speed sink regulating water tank+small diameter tubular reactor+activated carbon layer+biocake layer+ultrafiltration membrane", which can significantly enhance the removal efficiencies of multiple pollutants (e.g., particles, suspended solids, colloids, pathogenic microorganisms, ammonia nitrogen, organic matter, iron and manganese), and ensure the safety of drinking water quality supply;

4. High safety and reliability of drinking water supply:
   The conventional ultrafiltration membrane purification equipment needs regular hydraulic backwashing and chemical cleaning due to the formation of membrane fouling. During the cleaning, the ultrafiltration membrane purification equipment cannot produce water, especially in the situation of severe membrane fouling, which seriously affects the reliability of continuous water production by the conventional purification equipment; By contrast, the present invention of device adopts continuous filtration mode without any cleaning procedures, and avoids the occurrence of water cut off caused by hydraulic backwashing and chemical cleaning, effectively improving the reliability of drinking water supply; In addition, the device of present invention is powered by the solar power generation device. Thus, it can be operated normally even if there is a long-term power failure, ensuring the safety of drinking water supply;
   Membrane filtration coupling with low-dose disinfection to minimize the generation of disinfectant by-products:
      GAC slow-speed filter and gravity-driven ultrafiltration membrane tank (i.e., biocake layer and ultrafiltration membrane) can enhance the removals of dissolved organic matter, ammonia, micropollutants, and macromolecular organic matter to diminish the precursors of disinfectant by-products, resulting in reducing the adding dosage of disinfectant, and minimizing the production of disinfectant by-products.
6. The device is suitable for different types of water sources, such as groundwater, lake water, reservoir water, spring water, snowmelt water, cellar water and rainwater, etc. It is suitable for a variety of typical pollutants, such as turbidity, microorganisms, taste and odor, ammonia nitrogen, organic matter, iron, and manganese, etc.; The inventive device endows with merits of low energy consumption, near-zero maintenance, and low cost, continuous operation, a long cleaning cycle of one to several years, and extremely low driven pressure (0.002-0.02 Mpa).

The invention is applicable to the treatment of micropolluted water source in village and town.

DETAILED DESCRIPTION OF THE EMBODIMENTS

Figure 1:
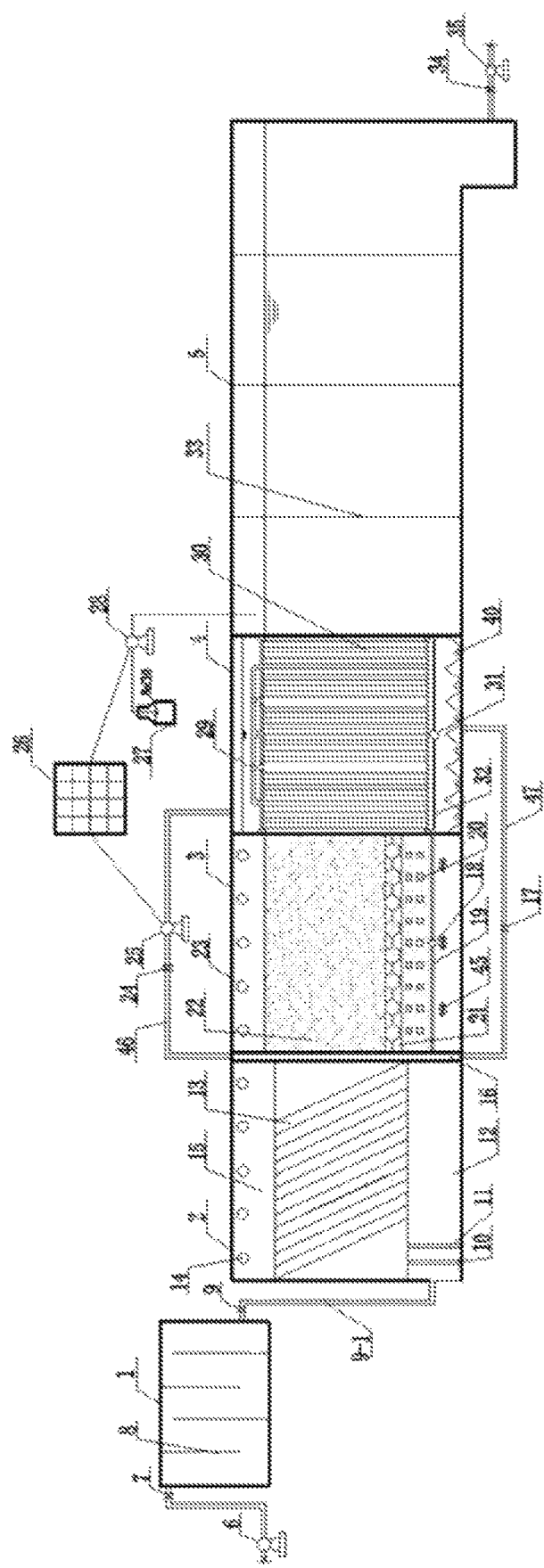
FIG. 1 is the schematic diagram of the overall structure of the near-zero maintenance integrated purification device for drinking water supply of villages and towns as described in Embodiment 1.

The following Embodiments further illustrate the contents of the present invention but should not be construed as the limitations of the present invention. Any modification or replacement of the method, procedure or condition of the invention, without departing from the essence of the invention, shall fall within the scope of the invention.

Embodiment 1: the Embodiment of a near-zero maintenance integrated purification device for drinking water supply of villages and towns includes small-spacing folding plate speed sink regulating water tank 1, small diameter tube reactor 2, GAC slow-speed filter tank 3, gravity-driven ultrafiltration membrane tank 4 and ipsilateral U-turn corridor clean water tank 5;

One end of the small-spacing folding plate speed sink regulating water tank 1 is communicated with raw water through the water inlet pipe, and the other end of the small-spacing folding plate speed sink regulating water tank 1 connected to the water inlet of the small diameter tubular reactor 2 through the outlet pipe 9-1 of the regulating water tank. Multiple folded plates are installed in a small-spacing folding plate speed sink regulating water tank 1 to form vertical folding flow;

The small diameter tubular reactor 2 includes a small diameter inclined tube 13, a first perforated uniform water wall 10, a second perforated uniform water wall 11 and a small diameter tubular reactor perforated collection pipe 14. The first perforated uniform water wall 10 and the second perforated uniform water wall 11 are set orderly at the water inlet of the small diameter tubular reactor 2 to distribute water uniformity, locating at the lower part of the ineffective area of the small diameter inclined tube 13. Thereinto, the holes of the first perforated uniform water wall 10 and the second perforated uniform water wall 11 are interlaced; The upper part of the small diameter inclined tube 13 is the clean water collection area 15, and the lower part of the small diameter inclined tube 13 is the water distribution area 12, and some perforated collection pipes 14 are installed in the clean water collection area 15;

A water collection channel 16 is arranged between the small diameter tubular reactor 2 and the GAC slow-speed filter 3. GAC slow-speed filter 3 includes main aeration pipe 18, aeration branch pipe 19, water distribution hole 20, support layer 21, activated carbon layer 22 and perforated water collection pipe of GAC slow-speed filter 23; The main aeration pipe 18, water distribution hole 20, support layer 21, activated carbon layer 22 and perforated water collection pipe of GAC slow-speed filter 23 are arranged orderly in GAC slow-speed filter 3 from bottom to top. A plurality of aeration branch pipes 19 are connected to the main aeration pipe 18, and the water collection channel 16 connected to GAC slow-speed filter 3 through water distribution holes 20;

The GAC slow-speed filter 3 is connected to the gravity-driven ultrafiltration membrane tank 4 through the perforated water collection pipe of the GAC slow-speed filter 23. In the gravity-driven ultrafiltration membrane tank 4, the main aeration pipe of the gravity-driven ultrafiltration membrane tank 31, the membrane module 30, and the water collection pipe of the gravity-driven ultrafiltration membrane tank 29 are arranged orderly from bottom to top. A plurality of aeration branch pipes of the gravity-driven ultrafiltration membrane tank 32 are connected to the main aeration pipe of the gravity-driven ultrafiltration membrane tank 31;

The gravity-driven ultrafiltration membrane tank 4 is connected to the ipsilateral U-turn corridor clean water tank 5 through the water collection pipe of the gravity-driven ultrafiltration membrane tank 29. A plurality of partition walls 33 are arranged in the ipsilateral U-turn corridor clean water tank 5 to form a push flow pattern.

A suction well connected to the rotary corridor 5-1 is provided at the bottom of the ipsilateral U-turn corridor clean water tank 5.

Embodiment 2: The differences between this Embodiment and Embodiment 1 are as follows: the water inlet pipe is equipped with a water inlet pump 6 and a water inlet valve 7; The distance between the adjacent two folding plates 8 is 0.2-1.0 m; The distance between the first perforated uniform water wall 10 and the second perforated uniform water wall 11 is 0.5-1.5 m, and the distance between the two adjacent collection pipes 14 is 0.2-0.4 m. Other steps are the same as those in Embodiment 1.

Embodiment 3: The differences between this Embodiment and Embodiment 1 or 2 are as follows: the gravity-driven ultrafiltration membrane tank 4 is equipped with dissolved oxygen detector; The membrane module 30 is a water grass type, column type or curtain type. The other steps are the same as those in Embodiment 1 or 2.

Embodiment 4: The differences between this Embodiment and Embodiments 1 to 3 are as follows: A circulation pipe 46 is provided between the water collection channel 16 and the gravity-driven ultrafiltration membrane tank 4, and a circulation valve 24 and a circulation pump 25 are set on the circulation pipe 46. Other steps are the same as those in Embodiments 1 to 3.

Embodiment 5: The differences between this Embodiment and Embodiments 1 to 4 are as follows: A bypass pipe line 47 is arranged between the gravity-driven ultrafiltration membrane tank 4 and the water collection channel 16, and the bypass pipe line 47 is controlled by the valve 17. Other steps are the same as those in Embodiments 1 to 4.

Embodiment 6: The differences between this Embodiment and Embodiments 1 to 5 are as follows: The GAC slow-speed filter tank 3 is equipped with an energy-saving double aeration systems 45 and a double-layer steel cross-hole block (to prevent the run off of the activated carbon). The energy-saving double aeration systems 45 is the microporous aeration disc, titanium plate, micro-nano aeration air pipe, or perforated aeration air pipe. Other steps are the same as those in Embodiments 1 to 5.

Embodiment 7: The differences between this Embodiment and Embodiments 1-6 are as follows: the ipsilateral U-turn corridor clean water tank 5 is equipped with disinfection facilities, and disinfectant is storage in the disinfection facility 27. Besides, the disinfection facility 27 connected to the ipsilateral U-turn corridor clean water tank 5 through the chemical inlet pipe; The chemical inlet pipe is equipped with a metering pump 28. The other steps are the same as those in Embodiments 1 to 6.

Embodiment 8: The differences between this Embodiment and Embodiments 1 to 7 are as follows: The sludge buckets are installed at the bottom of the small-spacing folding plate speed sink regulating water tank 1, and the sand is discharged via the first perforated mud discharge pipe 44, which is controlled by the first mud valve 37; The regulating water tank outlet valve 9 is arranged on the regulating water tank outlet pipe 9-1; The suction well is connected to the outlet water pipe of the ipsilateral U-turn corridor clean water tank 5, and the outlet water pipe are equipped with a water valve 34 and a pressure pump 35; A discharge valve 36 is installed at the bottom of the ipsilateral U-turn corridor clean water tank 5; The second perforated mud discharge pipe 38 is set at the bottom of the small diameter tubular reactor 2 which is controlled by the second mud valves 41; The third perforated mud discharge pipe 39 is set at the bottom of the GAC slow-speed filter 3, which is controlled by third mud valve 42; The fourth perforated mud discharge pipe 40 is set at the bottom of the gravity-driven ultrafiltration membrane tank 4, which is controlled by the fourth mud valve 43. The other steps are the same as those in Embodiments 1 to 7.

Embodiment 9: the differences between this embodiment and embodiments 1 to 8 are as follows: The circulating pump 25, the metering pump 28, and the energy-saving double aeration 45 are connected to the solar photovoltaic panel 26 and are powered by the solar photovoltaic panel 26. Other steps are the same as those in embodiments 1 to 8.

Embodiment 10: the differences between this embodiment and embodiments 1 to 9 are as follows: A method for treating source water by the near-zero maintenance integrated purification device for drinking water supply of villages and towns is implemented according to the following steps:

I. The raw water flows into the small-spacing folding plate speed sink regulating water tank 1. The large particles and suspended substances decreases in the process of flowing up and down, sink to the bottom of the small-spacing folding plate speed sink regulating water tank 1, and are discharged through the first perforated mud discharge pipe 44;

II. After the initial sedimentation of the small-spacing folding plate speed sink regulating water tank 1, the water flows into the small diameter tubular reactor 2 and enters the water distribution area 12 through the first perforated uniform wall 10 and the second perforated uniform wall 11, respectively. In the process of water flow through the small diameter inclined tube 13, the larger particles, sand and suspended substances sink to the bottom of the small pipe reactor 2 and are discharged through the second perforated mud discharge pipe 38; The water flows into the water collection channel 16 through the perforated water collection pipe 14 in the clean water area 15 to obtain the precipitated water;

III. After precipitation, the water enters the GAC slow-speed filter 3 through the water distribution hole 20. The GAC slow-speed filter 3 adopts upward flow, and the bottom is the water distribution area. The filtered water passes through the supporting layer 21 and the activated carbon layer 22 in turn. Open the aeration device 45, the air flow through the main aeration pipe 18 and aeration branch pipe 19 into the GAC slow-speed filter 3. The filtered water is harvested by the perforated water collection pipe 23 and then enters the gravity-driven ultrafiltration membrane tank 4;

IV. In the gravity-driven ultrafiltration membrane tank 4, water enters the membrane module 30 through the membrane hole. The gravity-driven ultrafiltration membrane tank 4 is aerated by the main aeration pipe 31 and the aeration branch pipe 32; The water from the membrane module 30 enters the ipsilateral U-turn corridor clean water tank 5 through the water collection pipe 29;

V. The ipsilateral U-turn corridor clean water tank 5 is provided with a plurality of reciprocating and rotary partitions and multiple partitions 33 make the water form a push flow state. The disinfection facility 27 is filled with disinfectant, and the metering pump 28 is used to add disinfectant. The filtered water sterilized by disinfection facilities is transported to the residents of villages and towns by the pump 35. That is, the method for treating source water with a near-zero maintenance integrated purification device for drinking water in villages and towns is completed. Other steps are the same as those of embodiments 1 to 9.

The present invention is described detailly in combination with the attached drawings and embodiments.

Figure 2:
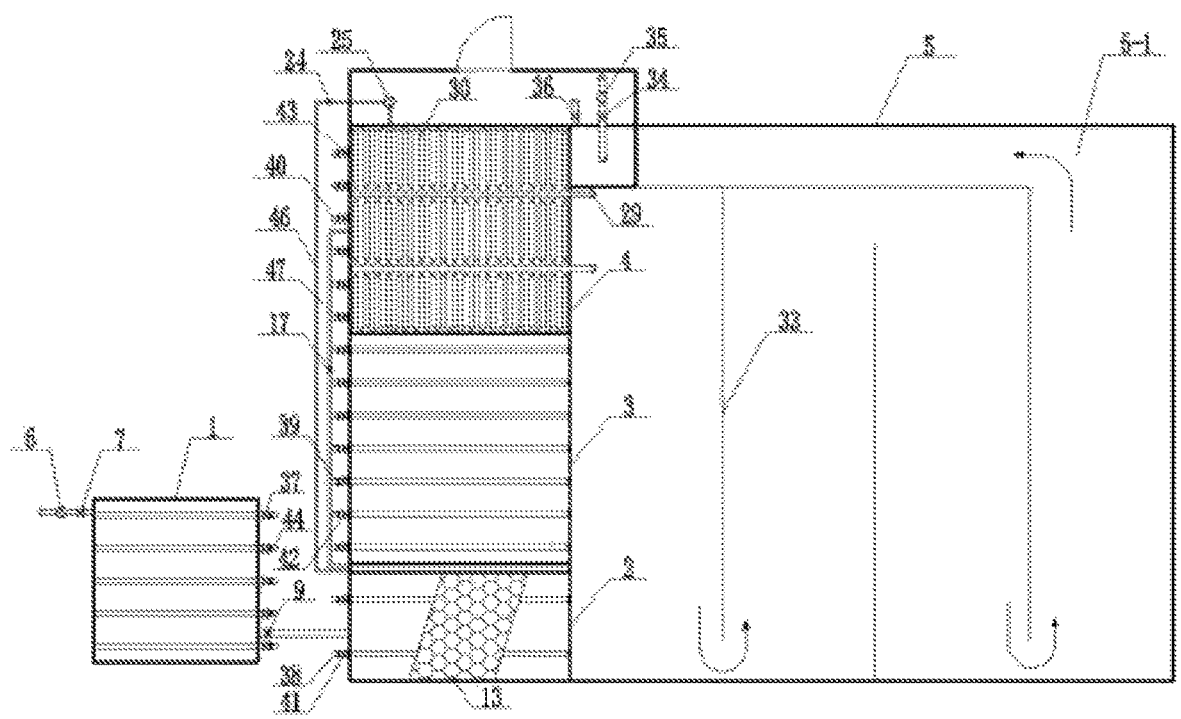
FIG. 2 is the overlooking structure diagram of the near-zero maintenance integrated purification device for drinking water supply of villages and towns as described in Embodiment 1.

Embodiment 1: This embodiment is illustrated in combination with FIG. 1 and FIG. 2. The Embodiment of a near-zero maintenance integrated purification device for drinking water in villages and towns includes a small-spacing folding plate speed sink regulating water tank 1, small diameter tube reactor 2, GAC slow-speed filter tank 3, gravity-driven ultrafiltration membrane tank 4 and ipsilateral U-turn corridor clean water tank 5;

One end of the small-spacing folding plate speed sink regulating water tank 1 is connected to raw water through the water inlet pipe, and the other end of the small-spacing folding plate speed sink regulating water tank 1 is connected to the small diameter tubular reactor 2 through the outlet pipe 9-1 of the regulating tank. A plurality of folding plates 8 are arranged in a small-spacing folding plate speed sink regulating water tank 1 to form vertical folding flow;

The small diameter tubular reactor 2 includes a small diameter inclined tube 13, a first perforated uniform water wall 10, a second perforated uniform water wall 11 and a small diameter tubular reactor perforated water collection pipe 14. The first perforated uniform water wall 10 and the second perforated uniform water wall 11 are successively installed at the water inlet of the small diameter tubular reactor 2. The first perforated uniform water wall 10 and the second perforated uniform water wall 11 are arranged at the lower part of the ineffective area of the small diameter inclined tube 13. The holes of the first perforated uniform water wall 10 and the second perforated uniform water wall 11 are interlaced; The upper part of the small diameter inclined tube 13 is the clean water area 15, and a plurality of water collection pipes 14 are provided in the clean water area 15. The lower part of the small diameter inclined tube 13 is the water distribution area 12;

A water collection channel 16 is arranged between the small diameter tubular reactor 2 and the GAC slow-speed filter 3. GAC slow-speed filter 3 includes the main aeration pipe 18, aeration branch pipe 19, water distribution hole 20, support layer 21, activated carbon layer 22 and perforated water collection pipe of GAC slow-speed filter 23; The the main aeration pipe 18, water distribution hole 20, support layer 21, activated carbon layer 22 and perforated water collection pipe of GAC slow-speed filter 23 are arranged in GAC slow-speed filter 3 from bottom to top. A plurality of aeration branch pipes 19 are connected to the main aeration pipe 18, and the water collection channel 16 is connected to GAC slow-speed filter 3 through water distribution holes 20;

The GAC slow-speed filter 3 is connected to the gravity-driven ultrafiltration membrane tank 4 through the perforated water collection pipe of the GAC slow-speed filter 23. In the gravity-driven ultrafiltration membrane tank 4, the main aeration pipe of the gravity-driven ultrafiltration membrane tank 31, the membrane module 30 and the water collection pipe of the gravity-driven ultrafiltration membrane tank 29 are arranged from bottom to top. A plurality of aeration branch pipes of the gravity-driven ultrafiltration membrane tank 32 are connected to the main aeration pipe of the gravity-driven ultrafiltration membrane tank 31;

The gravity-driven ultrafiltration membrane tank 4 is connected to the ipsilateral U-turn corridor clean water tank 5 through the water collection pipe of the gravity-driven ultrafiltration membrane tank 29. A plurality of partition walls 33 are arranged in the ipsilateral U-turn corridor clean water tank 5 to form a push flow pattern. The bottom of the ipsilateral U-turn corridor clean water tank 5 is provided with a sump, which is connected to the rotary corridor 5-1;

The water inlet pipe is equipped with a water inlet pump 6 and a water inlet valve 7;

The gravity-driven ultrafiltration membrane tank 4 is equipped with dissolved oxygen detector; The membrane module 30 is a water grass type, column type or curtain type;

A circulation pipe 46 is provided between the water collection channel 16 and the gravity-driven ultrafiltration membrane tank 4, and a circulation valve 24 and a circulation pump 25 are provided on the circulation pipe 46;

A bypass pipe line 47 is arranged between the gravity-driven ultrafiltration membrane tank 4 and the water collection channel 16, and the bypass pipe line 47 is controlled by the crossing valve 17;

The GAC slow-speed filter tank 3 is equipped with an energy-saving double aeration systems 45 and a double-layer steel cross-hole block (to prevent the run off of the activated carbon), and the energy-saving double aeration systems 45 could be a microporous aeration disc, a titanium plate, a micro-nano aeration air pipe, or a perforated aeration air pipe;

The ipsilateral U-turn corridor clean water tank 5 is equipped with disinfection facilities, and disinfectant is included in the disinfection facility 27. Besides, the disinfection facility 27 connected to the ipsilateral U-turn corridor clean water tank 5 through the chemical inlet pipe; The chemical inlet pipe is equipped with a metering pump 28;

The sludge buckets are installed at the bottom of the small-spacing folding plate speed sink regulating water tank 1, and the sludge is discharged via the first perforated mud discharge pipe 44, which is controlled by the first mud valve 37; The regulating water tank outlet valve 9 is arranged on the regulating water tank outlet pipe 9-1; The suction well is connected to the outlet water pipe of the ipsilateral U-turn corridor clean water tank 5, and the outlet water pipe are equipped with a water valve 34 and a pressure pump 35; The bottom of the ipsilateral U-turn corridor clean water tank 5 is provided with a vent valve 36; The second perforated mud discharge pipe 38 is set at the bottom of the small diameter tubular reactor 2 which is controlled by a second mud valves 41; The third perforated mud discharge pipe 39 is set at the bottom of the GAC slow-speed filter 3, which is controlled by the third mud valve 42; The fourth perforated mud discharge pipe 40 is set at the bottom of the gravity-driven ultrafiltration membrane tank 4, which is controlled by the fourth mud valve 43;

The circulating pump 25, the metering pump 28 and the energy-saving double aeration systems 45 are connected to the solar photovoltaic panel 26 and are powered by the solar photovoltaic panel 26;

Embodiment 1 is a near-zero maintenance integrated drinking water purification device for villages and towns with a design water treatment capacity of 100 $m^3/d$. the detailed process parameters of each unit are as follows:

I. Small-spacing folding plate speed sink regulating water tank 1:
  (1) Parameters of small-spacing folding plate speed sink regulating water tank 1:
    Size of small-spacing folding plate speed sink regulating water tank 1 is L×B×H=1.5 m×1.5 m×1.0 m, and the hydraulic retention time is 5-30 min; Four folded plates with a length of 1.5 m and a height of 0.7 m are set inside of the unit, and the distance of adjacent folded plates is 0.3 m, corresponding with a flow velocity of 0.003 m/s in the corridor. Besides, the water flow cross-section is 0.15 m, and corresponding flow velocity is 0.005 m/s. Five dredge buckets with a height of 0.15 m and a width of 0.3 m are set. The diameter of the first perforated drainpipe 44 is 50 mm.
  (2) The role of small-spacing folding plate speed sink regulating water tank 1:
    Small-spacing folding plate speed sink regulating water tank 1 has the functions of both regulating storage and initial sedimentation; When the feed water volume fluctuates, the regulating water tank could regulate the variation of water volume; When the raw water enters the regulating water tank, the sand and suspended particles will sediment firstly due to the decrease of flow rate, contributing to the reduction of turbidity.
  (3) Design features of small-spacing folding plate speed sink regulating water tank 1:
    This invention introduces a folding plate 8 into a small-spacing folding plate speed sink regulating water tank. In the process of water flow up and down in the unit, the flow rate decreases, and the large particles precipitates initially, which strengthens the precipitation efficiency.

II. Small diameter tubular reactor 2:
  (1) Parameters of small diameter tubular reactor 2:
    The size of small diameter tubular reactor 2: L×B×H=2.0 m×1.0 m×2.05 m; The small diameter inclined tube 13 is a regular hexagonal honeycomb pipe hot pressed with plastic sheets, with an inner diameter of 10 mm, an inclined tube length of 1.4 m and a vertical height of 1.0-1.2 m; The flow velocity in the clean water area 15 is 0.05-0.6 m/s, the flow velocity in the small diameter inclined tube 13 is 0.05-0.6 m/s, and the corresponding hydraulic retention time in the small diameter inclined pipe 13 is 0.5-6 h; The height of water distribution area 12 is 0.5 m, and that of clean water area 15 is 0.4 m. Two perforated walls with the cross-flow arrangement of water distribution holes are used for water distribution in water distribution area 12, and the through-hole flow rate is 0.015 m/s; The first perforated uniform water wall 10: water distribution holes are arranged in 3 rows. The adjacent horizontal hole center distance is 0.1 m, the side hole is 0.1 m away from the side wall, and the adjacent vertical hole center distance is 0.1 m; The second perforated uniform water wall 11: water distribution holes are arranged in 3 rows, the adjacent horizontal hole center is 0.1 m, and the side hole is 0.05 m away from the side wall; The adjacent vertical hole center spacing is 0.1 m; The distance between the first perforated uniform water wall 10 and the second perforated uniform water wall 11 is 1.2 m-1.5 m; The height of the sludge bucket is 0.15 m, and water collection pipe 14 is installed in the clean water area 15 to collect the precipitated water clean. There are 5 water collection pipes, the distance between the adjacent water collection pipes is 0.4 m, both sides water collection pipes is 0.2 m away from the wall, and the center of the water collection pipe is 0.1 m away from the upper inner bottom.
  (2) The role of small diameter tubular reactor 2:
    The small diameter tubular reactor 2 has the functions of both high-performance precipitation and biodegradation. On the one hand, it can further remove suspended solids and particles to reduction the turbidity; On the other hand, it can enhance the removal of dissolved pollutants due to the formation of a biofilm attached on the inner wall of the inclined pipe during the long-term operation.
  (3) Design characteristics of small diameter tubular reactor 2:
    A. Built-in water distribution area and cross-flow multi-channel perforated wall design:
      The water distribution area is located inside the small diameter tube reactor and below the ineffective area of the inclined tube, with the aims to further saving space and reducing footprint. Two perforated uniform water walls are used for water distribution in the water distribution area, and the water distribution holes are interlaced arrangement. Thus, the water distribution is more uniform and the dead water area is reduced to the greatest extent;
    B. Design of biofilm-attached small diameter tubular reactor (2):
      The small diameter inclined tube 13 is a small diameter regular hexagonal honeycomb tube with an inner diameter of 15 mm, an inclined tube length of 1.4 m, and a vertical height of 1.0-1.2 m. The hydraulic retention time in the inclined tube is 0.5-6 h, which effectively ensures the sufficient sediment time and improves the sediment efficiency. After the long-term operation, a biofilm attached to the inner wall of the inclined tube is generated, and the removal of dissolved pollutants can be enhanced with the assistance of biofilm;
    C. Small spacing encrypted water collection facilities:
      The small-spacing arrangement of perforated collection pipe 14 of the small diameter tubular reactor effective ensure effectively the uniformity of effluent water and reduce the flow disturbance. Therefore, the height of clean water area 15 of the inclined tube is reduced to the maximum extent, and the height of the device is reduced synchronously.

III. GAC slow-speed filter (3):
  (1) The parameters of the GAC slow-speed filter (3)
    The design treatment water scale is 100 m³/d, the size of GAC slow-speed filter 3 is: L×B×H=2.1 m×2.0 m×2.05 m, the overflow device size is L×B×H=0.4 m×0.1 m×0.4 m, and the range of the filtering velocity is 0.1-5 m/h; The height of bottom water distribution area is 0.5 m, the supporting layer is 0.15 m, the height of activated carbon layer is 1.1 m, the particle size of activated carbon is 4-10 mm, the contact time is 0.2-11 h, and the clean water area is 0.3 m; The height and width of the dredge bucket are 0.15 m and 0.3 m respectively. The third perforated drainpipe 39 is used to discharge mud, and its diameter is 50 mm; There are 5 perforated water collection pipes 23 in the GAC slow-speed filter. The adjacent spacing between perforated water collection pipes 23 of GAC slow-speed filter is 0.4 m. The perforated water collection pipes 23 of GAC slow-speed filter on both sides are 0.2 m away from the wall. The center of perforated water collection pipes 23 of GAC slow-speed filter is 0.1 m away from the pipe top. The aeration intensity of the main aeration pipe 18 is 15 L/(s·m²), the diameter of the main aeration pipe 18 is 50 mm, and the flow rate at the beginning of the main aeration pipe 18 is 32 m/s. There are 20 aeration branch pipes 19 in total. The diameter of the aeration branch pipe 19 is 20 mm, the flow rate of the aeration branch pipe 19 is 10 m/s, the diameter of the holes on the aeration branch pipes 19 is 5 mm, and the total number of holes is 500. Each of the aeration branch pipes 19 has 25 holes, and the spacing between the holes is 0.04 m; Two layers of steel blockers are set. The blockers are close to the surface of the activated carbon layer. The size of the first layer of blockers is 2 mm, and the size of the second layer is 4 mm.

(2) Functions of GAC slow-speed filter (3):
GAC slow-speed filter 3 can adsorb and degrade pollutants. Granular activated carbon can adsorption odor, dissolved organic matter, micropollutants (e.g., detergents, pesticides, insecticides, and herbicides, etc.); Microorganisms attached to activated carbon could degrade dissolved pollutants such as ammonia nitrogen, iron, manganese, and assimilable organic carbon (AOC).

(3) Design features of GAC slow-speed filter 3
A. Double-layer staggered network layout measures to prevent the loss of activated carbon:
Two layers of steel blockers are set in the upper surface of the activated carbon layer 22 to prevent the loss of activated carbon. The particle size of activated carbon ranges from 4 to 10 mm, and the aperture of the first layer of blockers is 2 mm, and the aperture of the second layer of blockers is 4 mm; The holes of the two-layer steel fence are staggered.
B. Energy-saving double-circuit aeration system design:
Micro-aeration facilities (such as microporous aeration disc and micro-nano aeration pipe) are set at the bottom of GAC slow-speed filter 3, which can be divided into two operating conditions: weak aeration and strong aeration.
(1) When DO<2 mg/L, the microporous aeration disc is adopted for weak aeration (continuous aeration or intermittent aeration) to provide an aerobic environment for microorganisms colonized within the activated carbon, enhancing the removal of pollutants;
(2) When the GAC slow-speed filter 3 reaches the pressure period (2.0-2.5 m head), the strong aeration (pulse aeration or continuous aeration) is used to clean the blocked filter layer and regulate the structure of the filter layer;
C. Filter backwash design without expansion:
The combination technology of aeration and weak water washing is adopted, and two layers of steel blockers are set on the upper surface of activated carbon to realize the in-situ high-frequency oscillation cleaning of GAC slow-speed filter 3 and the rapid removal of pollutants, achieving the minimum expansion of the filter layer during the cleaning process, and improve the effective utilization rate of the equipment.
D. Small spacing encrypted water collection facilities:
Through the small-spacing arrangement of the perforated collector pipe 23 of the GAC slow-speed filter, the uniformity of the effluent is improved and the flow disturbance is reduced, the height of the clean water area on the inclined pipe is reduced to the maximum extent, and the height of the device is reduced.

IV. Gravity-driven ultrafiltration membrane tank 4:
(1) Parameters of gravity-driven ultrafiltration membrane tank 4:
Design water treatment capacity: 100 m³/d, size of gravity-driven ultrafiltration membrane tank 4: L×B×H=2.0 m×1.8 m×2.05 m, flux: 5 L/m², 60 membrane modules, effective membrane area of single membrane module: 18 m², total membrane area: 1080 m²; Two water collection pipes with a diameter of 50 mm are set.

(2) Function of gravity-driven ultrafiltration membrane tank 4:
The gravity-driven ultrafiltration membrane tank 4 combines the biocake layer and ultrafiltration membrane to enhance the deep removal of pollutants and the efficient rejection of microorganisms, improving the biological safety of effluent.
A. Ultrafiltration membrane can effectively reject particulate matters, suspended substances, colloid and microorganisms, effectively ensuring the biological-safety drinking water supply;
B. The biocake layer attached to the membrane surface further removes iron, manganese, ammonia nitrogen, dissolved organic matter, and micropollutants.
The membrane module 30 is a water grass type, and a biocake layer on the surface of the membrane module 30 is formed after the operation of 30-60 d.

(3) Design features of gravity-driven ultrafiltration membrane tank 4:
A. Compared with conventional membrane filtration, gravity-driven ultrafiltration membrane tank 4 doesn't need a hydraulic backwash system (such as backwash pump, backwash water tank, backwash pipeline, and backwash automatic control system), cross-flow system (such as cross-flow pipeline, and control system), chemical cleaning system (such as reagent tank, reagent dosing pump, reagent dosing pipeline, reagent metering equipment, waste liquid collection tank, and automatic control system).
B. The driven-pressure is provided by the natural gravity force. Thus, there are not extra energy consumption during the filtration period, and it does not require a suction pump and corresponding piping system. The processes of water purification and water production are continuous even if power is cut off.
C. Weak aeration is adopted to effectively improve the aerobic environment of the biocake layer on the membrane surface; The weak shear action during aeration can promote the detachment and update of the aged biocake layer; Weak aeration enables the biocake layer become loose and porous, improving the mass transfer efficiency of materials. The detection and control system of dissolved oxygen are set, and the aeration intensity is adjusted dynamically based on the dissolved oxygen concentration.

D. The water-grass type membrane module is adopted, the bottom of the membrane module is not fixed, and the spacing between adjacent membrane filament is larger than that of the fixed one, which can effectively reduce the influence on flux decline introduced by the membrane pore blocking caused by sediment on the membrane surface; The membrane module adopts intensive central effluent mode, which greatly reduces the ineffective volume of gravity-driven ultrafiltration membrane tank 4 and the hydraulic condition is optimized, improving the membrane loading density;

E. Long mud discharge cycle. Gravity-driven ultrafiltration membrane tank 4 does not need frequent hydraulic or chemical cleaning, so the sediment foulants generated at the bottom is less. Generally, the mud can be discharged once every 10-90 days, and the mud discharge time is 0.5-3 min; The mud can be discharged automatically or manually.

V. Ipsilateral U-turn corridor clean water tank 5:
(1) Parameters of ipsilateral U-turn corridor clean water tank 5:
Size of ipsilateral U-turn corridor clean water tank 5: L×B×H=5.5 m×5.0 m×2.05 m; Hydraulic retention time: 14 h, emptying time: 6 h; Reciprocating partition wall interval: 1.4 m, corridor velocity: 0.0004 m/s, water cross-section length: 0.5 m, water cross-section velocity: 0.001 m/s, rotary partition wall distance: 0.56 m, corridor velocity: 0.001 m/s; The diameter of the discharge pipe is 60 mm, the diameter of the inlet pipe is 50 mm, and the diameter of the outlet pipe is 200 mm;

(2) The function of ipsilateral U-turn corridor clean water tank 5:
Ipsilateral U-turn corridor clean water tank 5 has the function of regulation and storage, and is also the main place of disinfection. Ipsilateral U-turn corridor clean water tank 5 can adjust the non-uniformity of the water production of the water plant and the water supply of the pump station.

(3) Design features of the ipsilateral U-turn corridor clean water tank 5:
Improve hydraulic flow, minimize stagnant water area and have good disinfection effect:
Compared with the reciprocating partition wall, the rotary+reciprocating partition wall can improve the hydraulic flow pattern, minimize the stagnant water area, make the disinfectant fully contact with pathogenic microorganisms, and improve the disinfection effect;

A. High degree of integration, simple operation and low maintenance:
The inlet water stays in the ipsilateral U-turn corridor clean water tank 5 for a certain time and then returns to the ipsilateral side of the inlet water. While ensuring the disinfection effect of the ipsilateral U-turn corridor clean water tank, the water supply pump and some other auxiliary fittings are placed in the integrated equipment room for the convenience of later operation management and maintenance.

VI. Circulation pipe 46 and bypass pipe line 47:
(1) Circulation pipe 46:
Time of circulation: when the raw water quality is poor (DOC concentration>5 mg/L) or the user has high requirements for the effluent quality (turbidity<0.1 NTU, DOC concentration<1 mg/L), it is necessary to circulate regularly (2-3 times a day, 1-2 h each time) to increase the retention time of water in the GAC slow-speed filter 3, so that the water can fully contact the activated carbon filter layer, thereby strengthening the removal of pollutants and improving the water quality;

A circulation line is arranged between GAC slow-speed filter tank 3 and gravity-driven ultrafiltration membrane tank 4.

Regularly circulate, the circulation flow is 50% of the flow, and the circulation time and frequency are dynamically adjusted according to the requirements of raw water quality and effluent quality (2-3 times a day, 1-2 hours each time). The circulation improves the residence time of water in GAC slow-speed filter 3, accelerates the formation of biofilter cake layer on the membrane surface, and improves the removal performance.

(2) Bypass pipe line 47:
A bypass pipe line 47 is provided between the water collection channel 16 and the gravity-driven ultrafiltration membrane tank 4. When the raw water quality is good, the effluent from the small diameter tubular reactor 2 directly enters the gravity-driven ultrafiltration membrane tank 4 through the bypass pipe line 47.

VII. Integrated equipment room:
Some pipe fittings and water supply pumps are placed in the integrated equipment room, which effectively reduces the footprint, has a beautiful appearance, and is convenient for later operation management and maintenance.

VIII. Energy saving and energy consumption reduction:
The aeration system corresponding to this embodiment (aeration system in GAC slow-speed filter tank 3 and gravity-driven ultrafiltration membrane tank 4), circulating pump, and metering pump required for disinfection are powered by solar photovoltaic panels 26, which convert solar energy into electricity and store it, reducing the operation energy consumption of the device (electrical energy).

Embodiment 2: The method for applying the near-zero maintenance integrated purification device for drinking water in villages and towns in Embodiment 1 to treat the source water is realized according to the following steps:

I. the micro-polluted source water flow into small-spacing folding plate speed sink regulating water tank 1. The sand and large particles decrease in the process of flowing up and down, sink to the bottom of the small-spacing folding plate speed sink regulating water tank 1, and are discharged through the first perforated mud discharge pipe 44;

II. After the initial sedimentation of the small-spacing folding plate speed sink regulating water tank 1, the water flows into the small diameter tubular reactor 2 and enters the water distribution area 12 through the first perforated uniform wall 10 and the second perforated uniform wall 11 in turn. In the process of water flow through the small diameter inclined tube 13, the larger particles and suspended matter sink to the bottom of the small pipe reactor 2 and are discharged through the second perforated mud discharge pipe 38; The water flows into the water collection channel 16 through the perforated water collection pipe 14 in the clean water area 15 to obtain the precipitated water;

III. After precipitation, the water enters the GAC slow-speed filter 3 through the water distribution hole 20. The GAC slow-speed filter 3 adopts upward flow, and the bottom is the water distribution area. The filtered water passes through the supporting layer 21 and the activated carbon layer 22 in turn. The pollutants including dissolved organic matter, ammonia nitrogen, iron, manganese and micropollutants are removed by the adsorption of activated carbon and biological degradation. Open the aeration device 45, main aeration pipe 18 and aeration branch pipe 19 set at the bottom of the GAC slow-speed filter 3, and the aeration enters into the GAC slow-speed filter 3. The filtered water is collected through the special small spacing intensive GAC slow-speed filter with perforated water collection pipe 23 and then enters the gravity-driven ultrafiltration membrane tank 4 to obtain the filtered water.

IV. In the gravity-driven ultrafiltration membrane tank 4, water enters the membrane module 30 through the membrane pores. Under the dual interception effect of both biocake layer and ultrafiltration membrane, the particles, suspended solids, colloid, micropollutants, dissolved organic matter, iron, manganese, ammonia nitrogen and microorganisms in the water are simultaneously removed; Gravity-driven ultrafiltration membrane tank 4 is aerated by main aeration tube 31 and aeration branch tube 32. Irregular weak aeration (when DO<2 mg/L aeration, aeration intensity 3-5 L/(s·m$^2$), time 1-2 h) is adopted to provide aerobic environment for microorganisms growth in the biofiltration cake layer on the membrane surface and promotes the update of the biocake layer; The effluent from the membrane module 30 enters the ipsilateral U-turn corridor clean water tank 5 through the water collection pipe 29;

V. The ipsilateral U-turn corridor clean water tank 5 is provided with a plurality of reciprocating and rotary partitions and multiple partitions 33 make the water form a push flow state. The disinfection facility 27 is filled with NaClO, and the metering pump 28 is used to add NaClO. The filtered water sterilized by disinfection facilities is transported to the residents of villages and towns by the pump 35. That is, the method for treating source water with a near-zero maintenance integrated purification device for drinking water in villages and towns is completed.

In Embodiment 2, the special energy-saving double aeration systems at the bottom of GAC slow-speed filter 3 is regularly aerated. Microporous aeration disc is used for weak aeration. The process of weak aeration is mainly to provide aerobic environment for microorganisms attached to activated carbon and improve the degradation effect, and the strong aeration process using the perforated tube plays a cleaning role; During strong aeration, gas enters GAC slow-speed filter 3 through main aeration pipe 18 and aeration branch pipe 19 in turn.

Embodiment 2: The removal performance of this process in treating the micro polluted source water in village and town is as follows:

(1) Turbidity:
   Although the turbidity of raw water varies greatly, the turbidity of effluent always remains at the level of (0.07±0.01) NTU, and it is still less than 0.1 NTU even during the rainstorm.
(2) Total number of bacteria:
   The total number of bacteria in the effluent of combined process of GAC slow-speed filter 3 and gravity-driven ultrafiltration membrane tank 4 is (10±2) CFU/mL, which is far lower than the drinking water standards.
(3) $UV_{254}$:
   The $UV_{254}$ concentration decreases significantly in the effluent of the combined process of GAC slow-speed filter 3 and gravity-driven ultrafiltration membrane tank 4, accounting to average removal efficiency of approximately 50-80%. Thereinto, the removal of $UV_{254}$ in the GAC slow-speed filter 3 is about 50-70%, indicating that $UV_{254}$ is mainly removed by GAC slow-speed filter 3.
(4) DOC removal:
   The DOC concentration in the effluent of the GAC slow-speed filter decreases and its removal rate is (82.7±7.15)% due to the biodegradation of microorganisms within GAC.
(5) TOC removal:
   The average TOC removal rate is (81.6±6.51)%, and the variation of TOC in raw water quality had little effect on its removal rate.
(6) AOC removal:
   AOC is a hydrophilic small molecule organic matter, which can be mainly removed by biodegradation. AOC represents the organic matter components that can easily consumed by microorganisms and is used to predict the regrowth potential of microorganisms. The AOC removal rate of effluent in the combined process of GAC slow-speed filter 3 and gravity-driven ultrafiltration membrane tank 4 can reach 60%-85%, which significantly improves the biological stability of effluent.
(7) Removal rate of organic matters with different molecular weights:
   According to the different molecular weight, organic matters are divided into: biopolymer (>20 KDa), humus (~1 KDa), humus monomer (~350-500 Da), small molecule acid organic matter and neutral matter (<350 Da). The corresponding removal rates is 80%-92%, 65%-74%, 70%-85%, 76%-91% and 60%-80% respectively.

Table 1 displays the removal performance of this process in treating the micro polluted source water in village and town in Embodiment 2;

TABLE 1

| Water quality index | Micro polluted source water in village and town | Effluent | Removal rate (%) |
|---|---|---|---|
| Turbidity (NTU) | 6.13 ± 4.43 | 0.07 ± 0.01 | <0.1 |
| Total number of bacteria (CFU/mL) | (0.8-2.6) × 1000 | 10 ± 2 | Meet standards |
| Escherichia coli (MPN/100 mL) | 2-30 | Not detected | 100 |
| UV254 (m$^{-1}$) | 0.101 ± 0.026 | 0.031 ± 0.012 | 69.3 ± 4.2 |
| Oxygen consumption (mg/L) | 2.73 ± 0.99 | 0.46 ± 0.12 | 81.6 ± 6.5 |

TABLE 1-continued

| Water quality index | Micro polluted source water in village and town | Effluent | Removal rate (%) |
|---|---|---|---|
| DOC mg/L | 2.33 ± 0.62 | 0.40 ± 0.11 | 82.7 ± 7.1 |
| Ammonia nitrogen mg/L | 0.45 ± 0.31 | 0.08 ± 0.22 | 82.3 ± 4.6 |
| AOC (μg/L) | 273 ± 8.1 | 46.6 ± 6.53 | 82.7 ± 14.1 |

What is claimed is:

1. A near-zero maintenance integrated purification device for drinking water supply of villages and towns, comprising a folding plate speed sink regulating water tank, a tubular reactor, a granular active carbon (GAC) filter tank, a gravity-driven ultrafiltration membrane tank and an ipsilateral U-turn corridor clean water tank;

a first end of the folding plate speed sink regulating water tank is connected to raw water through a water inlet pipe, and a second end of the folding plate speed sink regulating water tank is connected to a water inlet of the tubular reactor through an outlet pipe; folded plates are installed in the folding plate speed sink regulating water tank to form vertical folding flows;

the tubular reactor comprises an inclined tube, a first perforated uniform water wall, a second perforated uniform water wall, and first perforated water collection pipes; the first perforated uniform water wall and the second perforated uniform water wall are set orderly at an inlet area of the tubular reactor; the first perforated uniform water wall and the second perforated uniform water wall are located at a lower part of an ineffective area of the inclined tube; holes of the first perforated uniform water wall and the second perforated uniform water wall are interlaced; an upper part of the inclined tube is a clean water collection area, and a lower part of the inclined tube is a water distribution area; the first perforated water collection pipes are installed in the clean water collection area;

a water collection channel is arranged between the tubular reactor and the GAC filter tank; the GAC filter tank comprises a first main aeration pipe, first aeration branch pipes, water distribution holes, a support layer, an activated carbon layer and a second perforated water collection pipe; the first main aeration pipe, the water distribution holes, the support layer, the activated carbon layer and the second perforated water collection pipe of the GAC filter tank are arranged orderly in the GAC filter tank from bottom to top; the first aeration branch pipes are connected to the first main aeration pipe, and the water collection channel connected to the GAC filter tank through the water distribution holes;

the GAC filter tank is connected to the gravity-driven ultrafiltration membrane tank through the second perforated water collection pipe; in the gravity-driven ultrafiltration membrane tank, a second main aeration pipe, a membrane module, and a water collection pipe are arranged orderly from bottom to top; second aeration branch pipes of the gravity-driven ultrafiltration membrane tank are connected to the second main aeration pipe;

the gravity-driven ultrafiltration membrane tank connected to the ipsilateral U-turn corridor clean water tank through the water collection pipe; partition walls are arranged in the ipsilateral U-turn corridor clean water tank to form a push flow pattern; and a suction well connected to a rotary corridor is provided at a bottom of the ipsilateral U-turn corridor clean water tank.

2. The near-zero maintenance integrated purification device according to claim 1, wherein the water inlet pipe is equipped with a water inlet pump and a water inlet valve; a distance between adjacent two folded plates is 0.2-1.0 m; a distance between the first perforated uniform water wall and the second perforated uniform water wall is 0.5-1.5 m, and a distance between two adjacent first perforated water collection pipes is 0.2-0.4 m.

3. The near-zero maintenance integrated purification device according to claim 1, wherein the gravity-driven ultrafiltration membrane tank is equipped with a dissolved oxygen detector; and the membrane module is a water grass type membrane module, a column type membrane module or a curtain type membrane module.

4. The near-zero maintenance integrated purification device according to claim 1, wherein a circulation pipe is provided between the water collection channel and the gravity-driven ultrafiltration membrane tank, and a circulation valve and a circulation pump are set on the circulation pipe.

5. The near-zero maintenance integrated purification device according to claim 1, wherein a bypass pipe line is arranged between the gravity-driven ultrafiltration membrane tank and the water collection channel, and the bypass pipe line is controlled by a crossing valve.

6. The near-zero maintenance integrated purification device according to claim 1, Wherein the GAC filter tank is equipped with an energy-saving double aeration device and a double-layer steel cross-hole block, and the energy-saving double aeration device is one of a microporous aeration disc, a titanium plate, a micro-nano aeration air pipe, and a perforated aeration air pipe.

7. The near-zero maintenance integrated purification device according to claim 1, wherein the ipsilateral U-turn corridor clean water tank is equipped with disinfection facilities; the disinfection facilities are connected to the ipsilateral U-turn corridor clean water tank through a chemical inlet pipe; and the chemical inlet pipe is equipped with a metering pump.

8. The near-zero maintenance integrated purification device according to claim 1, wherein dredge buckets are installed at a bottom of the folding plate speed sink regulating water tank; a sediment sludge is discharged via a first perforated mud discharge pipe, and the first perforated mud discharge pipe is controlled by a first mud valve; a regulating water tank outlet valve is arranged on the outlet pipe of the folding plate speed sink regulating water tank; the suction well is connected to an outlet water pipe, and the outlet water pipe is equipped with a water valve and a pressure pump; the bottom of the ipsilateral U-turn corridor clean water tank is provided with a discharge valve; a second perforated mud discharge pipe is set at a bottom of the tubular reactor, and the second perforated mud discharge pipe is controlled by a second mud valves; a third perforated mud discharge pipe is set at a bottom of the GAC filter tank, and the third perforated mud discharge pipe is controlled by a third mud valve; a fourth perforated mud discharge pipe is set at a bottom of the gravity-driven ultrafiltration membrane tank, and the fourth perforated mud discharge pipe is controlled by a fourth mud valve.

9. The near-zero maintenance integrated purification device according to claim 4, wherein the circulation pump, a metering pump and an energy-saving double aeration device are connected to a solar photovoltaic panel and are powered by the solar photovoltaic panel.

10. A method of treating source water using the near-zero maintenance integrated purification device according to claim 1, wherein the method comprises the following steps:
step 1) the raw water flows into the folding plate speed sink water regulating tank; sand and large particles decrease in a process of flowing up and down, sink to a bottom of the folding plate speed sink regulating water tank, and are discharged through a first perforated mud discharge pipe;
step 2) after initial sedimentation of the folding plate speed sink regulating water tank, the raw water flows into the tubular reactor and enters the water distribution area through the first perforated uniform wall and the second perforated uniform wall orderly; when the raw water flows through the inclined tube, the larger particles and suspended matter sink to a bottom of the tubular reactor and are discharged through a second perforated mud discharge pipe; the raw water flows into the water collection channel through the first perforated water collection pipe in the clean water collection area to obtain precipitated water;
step 3) after precipitation, the precipitated water enters the GAC filter tank through the water distribution holes; the GAC filter tank adopts upward flow, and the bottom is the water distribution area; the precipitated water passes through the support layer and the activated carbon layer in turn; an energy-saving double aeration device, the first main aeration pipe and the first aeration branch pipes set at the bottom of the GAC filter tank are turned on, and air bubbles enter the GAC filter tank; the filtered water is collected and obtained by the second perforated water collection pipe of the GAC filter tank and then enters the gravity-driven ultrafiltration membrane tank;
step 4) in the gravity-driven ultrafiltration membrane tank, the filtered water enters the membrane module through membrane pores; the gravity-driven ultrafiltration membrane tank is aerated by the second main aeration pipe and the second aeration branch pipes; the filtered water from the membrane module enters the ipsilateral U-turn corridor clean water tank through the water collection pipe of the gravity-driven ultrafiltration membrane tank;
step 5) the ipsilateral U-turn corridor clean water tank is provided with reciprocating and rotary partition walls; the reciprocating and rotary partition walls make the filtered water form a push flow state; the sterilized water is transported to residents of the villages and towns by a pressure pump, thereby completing the method of treating source water with the near-zero maintenance integrated purification device for drinking water in villages and towns.

11. The method according to claim 10, wherein in the near-zero maintenance integrated purification device, the water inlet pipe is equipped with a water inlet pump and a water inlet valve; a distance between adjacent two folding plates is 0.2-1.0 m; a distance between the first perforated uniform water wall and the second perforated uniform water wall is 0.5-1.5 m, and a distance between two adjacent first perforated water collection pipes is 0.2-0.4 m.

12. The method according to claim 10, wherein in the near-zero maintenance integrated purification device, the gravity-driven ultrafiltration membrane tank is equipped with a dissolved oxygen detector; and the membrane module is a water grass type membrane module, a column type membrane module or a curtain type membrane module.

13. The method according to claim 10, wherein in the near-zero maintenance integrated purification device, a circulation pipe is provided between the water collection channel and the gravity-driven ultrafiltration membrane tank, and a circulation valve and a circulation pump are set on the circulation pipe.

14. The method according to claim 10, wherein in the near-zero maintenance integrated purification device, a bypass pipe line is arranged between the gravity-driven ultrafiltration membrane tank and the water collection channel, and the bypass pipe line is controlled by a crossing valve.

15. The method according to claim 10, wherein in the near-zero maintenance integrated purification device, the GAC filter tank is equipped with the energy-saving double aeration device and a double-layer steel cross-hole block, and the energy-saving double aeration device is one of a microporous aeration disc, a titanium plate, a micro-nano aeration air pipe, and a perforated aeration air pipe.

16. The method according to claim 10, wherein in the near-zero maintenance integrated purification device, the ipsilateral U-turn corridor clean water tank is equipped with the disinfection facilities; the disinfection facilities are connected to the ipsilateral U-turn corridor clean water tank through a chemical inlet pipe; and the chemical inlet pipe is equipped with a metering pump.

17. The method according to claim 10, wherein in the near-zero maintenance integrated purification device, dredge buckets are installed at the bottom of the folding plate speed sink regulating water tank; a sediment sludge is discharged via the first perforated mud discharge pipe, and the first perforated mud discharge pipe is controlled by a first mud valve; a regulating water tank outlet valve is arranged on the outlet pipe of the folding plate speed sink regulating water tank; the suction well is connected to an outlet pipe of the ipsilateral U-turn corridor clean water tank, and the outlet water pipe is equipped with a water valve and the pressure pump; the bottom of the ipsilateral U-turn corridor clean water tank is provided with a discharge valve; the second perforated mud discharge pipe is set at the bottom of the tubular reactor, and the second perforated mud discharge pipe is controlled by a second mud valves; a third perforated mud discharge pipe is set at the bottom of the GAC filter tank, and the third perforated mud discharge pipe is controlled by a third mud valve; a fourth perforated mud discharge pipe is set at a bottom of the gravity-driven ultrafiltration membrane tank, and the fourth perforated mud discharge pipe is controlled by a fourth mud valve.

18. The method according to claim 13, wherein in the near-zero maintenance integrated purification device, the circulation pump, a metering pump and an energy-saving double aeration device are connected to a solar photovoltaic panel and are powered by the solar photovoltaic panel.

* * * * *